United States Patent Office 2,793,124
Patented May 21, 1957

2,793,124

PROCESS TO CONVERT BIXIN TO A FOOD COLOR AND THE RESULTING PRODUCT

August J. Buzas, Easton, John M. Dusinski, Nazareth, and Remsen Ten Eyck Schenck, Bangor, Pa., assignors to Keystone Chemurgic Corporation, Bethlehem, Pa., a corporation of Pennsylvania No Drawing. Application June 15, 1955, Serial No. 515,767

11 Claims. (Cl. 99—148)

This invention relates to a novel food coloring material and to a process for converting bixin, and particularly to a process for processing bixin derived from annatto so that the final product has a greatly improved solubility in oil-type solvents and at the same time imparts a color to oil solutions which is pure yellow substantially devoid of red.

The colored components of the seed of the plant Bixa orellana L. have been known and used for a very long time. They are not distributed throughout the seed, but are found only as a thin coating on the surface, from which they may be extracted by oxygenated organic solvents. The concentrated residue of such an extract constitutes the commercial vegetable dyestuff annatto. This is not very satisfactory as a dye, though it can be used to impart a strong orange hue to silk, because it is not fast in any respect. It is, however, highly desirable as a colorant for foodstuffs because it is devoid of toxicity. With the recent discovery of long-term toxic effects produced by certain of the permitted aniline dyes, vegetable dyes have assumed a new importance.

Crude annatto can be separated into several fractions by appropriate treatment. For example, the involatile residue obtained by extracting the seed with a lower aliphatic alcohol, ketone, ether or ester and distilling off the solvent is found to be a viscous paste made up of solid particles dispersed in an oily medium. If this be stirred with benzene or one of its liquid homologues, the oily fraction dissolves and the solid may then be filtered or centrifuged off. This solid, which constitutes 30 to 35% of the whole, is a pure or nearly pure substance known as bixin, $C_{25}H_{30}O_4$, M. P. 217° C. Its constitution has been established (Kuhn & Ehmann, Helv. Chim. Acta 11, 427 (1928); 12, 64, 904 (1929); Ber. 64, 1732 (1931); 65, 646, 1873 (1932) as the monomethyl ester of 3, 5, 7, 9, 11, 13, 15, 17, 19, 21-tetracosadecaenedioic acid; it is thus related to carotene. The soluble oily fraction, freed of hydrocarbon solvent, may be subjected to a saponification treatment by heating with alcoholic caustic. Upon dilution of the reaction mixture with water and evaporation of most or all of the alcohol, a supernatant unsaponifiable fraction, comprising about 20% of the crude extract, collects and can be separated. This has negligible tinctorial power, comparatively, but is valuable for its content of carotenes and xanthophylls. On acidification the aqueous layer precipitates a resinous mass composed of norbixin and isomers thereof; that is, bixin and isomeric substances which have been converted to the free dibasic acid form by the demethylating action of the saponification reagent. This fraction makes up nearly 50% of the crude extract.

Bixin, its isomers, and their demethylation products have essentially identical absorption spectra in the visible region. It can further be shown that the color of the crude extract is due almost entirely to these substances, since the absorption spectrum of the crude for visible light is superimposable on that of either bixin or the isomer fraction.

For the purpose of coloring foods either crude annatto or the separated bixin or bixin isomer fractions may be used, since they are very nearly equivalent in all respects except coloring potency. The shade produced is suitable for certain applications, for instance, some kinds of cheese. It is not so desirable, however, in other instances for which it has been suggested, such as coloring oleomargarine and intensifying the hue of pale butter. For this use a dye is desirable which is a nearly pure yellow, whereas bixin and its isomers impart to their solutions a distinctly reddish cast. The result is in dilute solution a pinkish yellow, which in higher concentrations becomes an intense reddish orange. A further difficulty lies in the fact that both crude annatto and its several components have only a very limited solubility in oils and other solvents which are permissible for use in foods. It is thus necessary either to add them in concentrated form, which calls for lengthy milling in order to disperse the dye adequately, or to introduce them as quite dilute solutions. Both alternatives are undesirable, at least in the coloring of oleomargarine and butter.

The invention herein to be described is a method for processing bixin derived from annatto, such that the color imparted to oil solutions by the product is a pure yellow, devoid of any trace of redness. At the same time the crystalline bixin is converted into a taffy-like substance which exhibits a vastly greater solubility in oil-type solvents, and is thus greatly improved with respect to convenience in use.

This process is specifically applicable to pure, crystalline bixin; it does not appear to affect the isomeric materials. Therefore, while it may be conducted upon crude annatto, only the bixin content thereof is converted to a soluble yellow, the isomers remaining as reddish substances of low solubility. In consequence, the redness of the crude is reduced but not altogether eliminated.

Conversion of pure, crystalline, red bixin to the oil-soluble yellow resinous material is accomplished according to the process of the present invention by heating in a lower aliphatic monocarboxylic acid in the presence of the anhydride of the acid. It is important that air be excluded throughout the processing, since oxygen catalyzes a polymerization to insoluble pigments and can thus occasion a very serious loss of material. This catalysis is minimized, though not entirely prevented, by maintaining a blanket of inert gas, such as nitrogen or carbon dioxide, over the mixture from the moment it is composed. The acid anhydride functions as a catalyst for the conversion, while the fatty acid serves merely as a solvent. It is possible, though less convenient, to use other organic solvents—lower aliphatic alcohols, for example—but the acid anhydride is indispensable. The following procedure will serve as a typical example of the process.

One hundred parts of bixin and 1000 parts of glacial acetic acid, by weight, are charged into a two-necked flask of such capacity as to be about half-filled thereby. To one neck is fitted a reflux condenser, to the other an inlet tube for gas. Five parts of acetic anhydride is added, a gentle stream of nitrogen is started through the gas inlet tube, and the mixture is heated, electrically on in an oil bath, until the solvent boils gently. The bixin is only partly soluble at first, but as the reaction proceeds it is noted that the excess solid slowly disappears. After two or three hours an additional five parts of acetic anhydride is introduced. The heating is continued for a short time after all the solid has disappeared, a matter of some five hours in all. While continuing to exclude the atmosphere by means of the stream of nitrogen, the reflux condenser is changed to a condenser for distillation and the solvent is removed at a low temperature in vacuo. By the time no more acetic acid will distill, the residue has become a viscous red taffy. Still maintaining the blanket of nitrogen, there is added the appropriate quantity of the desired final solvent for the dye, and the vessel is kept at a temperature of approximately 50° C. with agitation until no further diminution in the amount of undissolved solid can be noted. At this point the nitrogen is arranged to bubble through the solution, which is thus flushed at about 50° C. until no odor of acid or acid anhydride remains. The mixture is then cooled to room temperature and filtered, preferably still under an inert atmosphere. It may then be safely exposed to the air, though stability is improved by continued exclusion of oxygen as far as practicable. Approximately 10% of the bixin taken is lost as insoluble polymer, presumably formed by the action of remaining traces of oxygen; the balance dissolves in the form of yellow dye.

The absorption spectrum of this solution in isopropyl alcohol shows a single fairly sharp maximum at a wavelength of 405 millimicrons; under similar conditions bixin itself exhibits a major absorption maximum at approximately 460 millimicrons and a minor one at 485.

Suitable solvents for the yellow dye thus prepared include the majority of edible fats and oils. Among the most convenient of these for the purpose are "winterized" cottonseed, peanut, corn and soy bean oils. Each substance exerts a distinct protective action upon the dye against the effects of heat and age; presumably the natural antitoxidants of the oil-inhibit the tendency toward bleaching and polymerization to insoluble materials which results from the action of atmospheric oxygen.

The solubility in edible oils of the dye produced by the herein-described process is in the neighborhood of 10% by weight at ordinary temperatures. Since approximately 15 grams of the dye is required to impart to a ton of margarine the customary intensity of color, 150 grams of such a 10% solution in oil suffices to treat a ton of margarine.

In the event that the hue thus produced is deemed too yellow, it may be brought back toward the red or orange to any desired degree by mixing in some unprocessed material. While crude annatto or any of its components may of course be used, the most suitable choice is the isomer fraction, by virtue of the fact that it possesses the highest solubility in oil-type solvents. Solutions of this fraction in edible oils may be obtained in concentrations up to about 3% by weight at ordinary temperatures, and since this material contains a pronounced red factor, only a small addition of such a solution lends a "warm" orange tint to the yellow dye.

Considerably more concentrated solutions of both yellow dye and red additive can be obtained by shortening the hydrocarbon chains of the fatty acids in the oil triglycerides. For example, solutions of yellow dye in tributyrin of 25% strength by weight, and of bixin isomer fraction of 10% strength are readily prepared. In triacetin even higher concentrations of both can be achieved. Both tributyrin and triacetin are edible materials; the former is a natural component of butter, and the latter, in the process of normal fat assimilation, is converted to acetic acid and glycerine, both common foodstuffs. It is desirable to formulate dyes for margarine and butter in as high concentration as possible, in order to minimize the quantity of extraneous material to be added; it is therefore significant that only about 60 gm. of a 25% solution of the yellow dye in tributyrin or triacetin is required to color a ton of margarine. Such solutions may profitably have added to them small amounts of an innocuous antioxidant, such as alpha-tocopherol, to take the place of the natural antioxidants of edible oils.

While we have described the process of the present invention by reference to a preferred example, it will be understood that various modifications and changes may be made in the specific steps and in the selection of equivalent materials all within the scope of the invention as defined in the appended claims.

Having thus described our invention, we claim:

1. In a process for converting bixin to a yellow coloring material, the steps comprising heating bixin with a lower aliphatic monocarboxylic acid in the presence of an anhydride of said acid and excluding air during the resulting reaction.

2. In a process for converting bixin to a yellow coloring material, the steps comprising heating bixin with acetic acid in the presence of acetic anhydride and excluding air during the resulting reaction.

3. In a process for converting bixin to a yellow coloring material, the steps comprising heating bixin with acetic acid and acetic anhydride and maintaining a blanket of inert gas over the mixture during the resulting reaction.

4. In a process for converting bixin to a yellow coloring material, the steps comprising heating bixin with acetic acid and acetic anhydride and maintaining a blanket of nitrogen over the mixture during the resulting reaction.

5. In a process for converting bixin to a yellow coloring material, the steps comprising heating bixin with acetic acid and acetic anhydride and maintaining a blanket of carbon dioxide gas over the mixture during the resulting reaction.

6. In a process for converting bixin to a yellow coloring material, the steps comprising heating bixin with acetic acid and acid anhydride continuously maintaining a blanket of inert gas over the resulting mixture, distilling off the acetic acid and then adding a solvent for the product thus produced while still maintaining the blanket of inert gas.

7. The process of claim 6 further characterized by the step of bubbling nitrogen through the solution formed after the addition of said solvent.

8. A yellow coloring material suitable for addition to foods comprising the conversion product obtained by heating bixin with a lower aliphatic monocarboxylic acid in the presence of a catalyst consisting of an anhydride of said acid while excluding air during the reaction.

9. A yellow coloring material suitable for addition to foods consisting of the conversion product obtained by heating bixin with a lower aliphatic monocarboxylic acid in the presence of a catalyst consisting of an anhydride of said acid while excluding air during the reaction, said conversion product being dissolved in an ester of glycerine.

10. A yellow coloring material suitable for addition to foods consisting of the conversion product obtained by heating bixin with a lower aliphatic monocarboxylic acid in the presence of a catalyst consisting of an anhydride while excluding air during the reaction, said conversion product being dissolved in triacetin.

11. A yellow coloring material suitable for addition to foods consisting of the conversion product obtained by heating bixin with a lower aliphatic monocarboxylic acid in the presence of a catalyst consisting of an anhydride while excluding air during the reaction, said conversion product being dissolved in tributyrin.

References Cited in the file of this patent

UNITED STATES PATENTS

| | | |
|---|---|---|
| 59,975 | Dake | Nov. 27, 1866 |
| 1,203,594 | Ellis | Nov. 7, 1916 |

OTHER REFERENCES

Chem. Abs., vol. 47, 1953, p. 10146c.